(12) United States Patent
Hughes

(10) Patent No.: US 7,107,163 B1
(45) Date of Patent: Sep. 12, 2006

(54) MAGNETIC LEVITATION FORCE CONTROL

(75) Inventor: John G. Hughes, Casselberry, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 226 days.

(21) Appl. No.: 10/838,405

(22) Filed: May 4, 2004

Related U.S. Application Data

(60) Provisional application No. 60/468,700, filed on May 6, 2003.

(51) Int. Cl.
*G06F 19/00* (2006.01)

(52) U.S. Cl. .................... 702/65; 310/90.5; 104/282; 335/229

(58) Field of Classification Search .............. None
See application file for complete search history.

(56) References Cited

U.S. PATENT DOCUMENTS

| | | | | |
|---|---|---|---|---|
| 4,953,470 A | * | 9/1990 | Yamaguchi | 104/282 |
| 5,099,175 A | * | 3/1992 | Schlueter et al. | 315/4 |
| 5,237,229 A | * | 8/1993 | Ohishi | 310/90.5 |
| 5,628,252 A | * | 5/1997 | Kuznetsov | 104/284 |
| 5,631,617 A | * | 5/1997 | Morishita | 335/216 |
| 6,101,952 A | * | 8/2000 | Thornton et al. | 104/282 |
| 6,286,434 B1 | * | 9/2001 | Fischperer | 104/290 |
| 6,388,417 B1 | * | 5/2002 | Keith | 318/701 |
| 6,515,388 B1 | * | 2/2003 | Moriyama et al. | 310/90.5 |
| 6,731,083 B1 | * | 5/2004 | Marcinkiewicz | 318/254 |
| 6,871,597 B1 | * | 3/2005 | Hughes | 104/281 |
| 6,911,754 B1 | * | 6/2005 | Johnson | 310/90.5 |
| 2002/0011754 A1 | * | 1/2002 | Shinozaki | 310/90.5 |
| 2002/0074883 A1 | * | 6/2002 | Yamauchi et al. | 310/90.5 |
| 2002/0090287 A1 | * | 7/2002 | Pelrine et al. | 414/749.2 |
| 2004/0002840 A1 | * | 1/2004 | Busch | 703/5 |
| 2004/0080895 A1 | * | 4/2004 | Johnson | 361/143 |
| 2004/0221762 A1 | * | 11/2004 | Hughes | 104/284 |
| 2005/0199154 A1 | * | 9/2005 | Hoffmann et al. | 104/281 |

OTHER PUBLICATIONS

Kang et al., "Design of an Integrated Propulsion, guidance, and Levitation System by Magnetically Excited Transverse Flux Linear Motor (TFM-LM)", IEEE, 2004.*
Morishita et al., "A New Maglev System for Magnetically Levitated Carrier System", IEEE, 1990.*
"3-D FEM Field Analysis in Controlled-PM LSM for Maglev Vehicle", IEEE, 1997.*
"Sensorless DTC Propulsion of a 1/2-Scale Controlled-PM LSM Vehicle with Minimum Energy-Loss Attractive-Levitation", IEEE, 2002.*
Bittar et al., "A New Approach to the Levitation Control of an Electromagnetic Suspension Vehicle", IEEE, 1998.*

* cited by examiner

*Primary Examiner*—Patrick J. Assouad
(74) *Attorney, Agent, or Firm*—Jeffrey D. Myers; Timothy D. Stanley; Peacock Myers, P.C.

(57) ABSTRACT

An apparatus and method for predicting attractive magnetic levitation force comprising measuring flux density for a component of an attractive magnetic levitation system and computing a predicted attractive magnetic levitation force from the flux density.

40 Claims, 3 Drawing Sheets

MAGNETIC LEVITATION FORCE CONTROL

CROSS-REFERENCE TO RELATED APPLICATIONS

This application claims the benefit of the filing of U.S. Provisional Patent Application Ser. No. 60/468,700, entitled "Magnetic Levitation Force Control", filed on May 6, 2004, and the specification thereof is incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to force control for attractive magnetic levitation, particularly for trains.

2. Background Art

The primary parameter that must be controlled in attractive magnetic levitation is lift force. Lift force can be measured with strain gauges, but these devices are extremely sensitive to the thermal environment. Force can be predicted as a function of gap, lateral displacement, and current, but the prediction is very sensitive to measurement errors in gap and current. Better, more robust force prediction is needed, which is provided by the present invention.

BRIEF SUMMARY OF THE INVENTION

The present invention is of an apparatus and method for predicting attractive magnetic levitation force, comprising: measuring flux density for a component of an attractive magnetic levitation system; and computing a predicted attractive magnetic levitation force from the flux density. In the preferred embodiment, computing comprises calculating a polynomial equation, most preferably a second order polynomial equation. A predicted attractive magnetic levitation force is also calculated from measured lateral displacement, preferably by calculating a polynomial equation, most preferably a third-order polynomial equation. The two predictions are then combined. A prediction from measured magnetic gap can also be calculated and combined with the prediction from the flux density and/or lateral displacement. A flux sensing coil is employed, preferably with each of the plurality of bogies of the attractive magnetic levitation system. The predictions by the invention have an error of less than or equal to approximately 1 percent, and even less than or equal to approximately 0.1 percent.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

In the present invention, which is of an apparatus and method for predicting force in an attractive magnetic levitation system, force is predicted by measurement of flux density, magnetic gap, and lateral displacement. In this approach, force is a strong function of SQRT (Flux) and a weak function of gap and lateral displacement.

In present systems, force is predicted by measuring gap, lateral displacement, and current. In other systems, flux density is controlled directly, with inherent force errors of 15% to 25%. Augmenting flux density with lateral displacement and gap information results in force prediction with less than 1% error. This approach eliminates the requirement for expensive secondary suspension systems on attractive magnetic levitation vehicles.

A typical prior art force controller is based upon a polynomial using magnet gap, current, and lateral displacement. It is very sensitive to errors in gap measurement. This results in poor ride quality. The present invention employs flux density, gap, and lateral displacement. It has low sensitivity to gap errors. Ride quality is improved by a factor of approximately twenty-three.

Preferably, a flux gauge is used to measure flux density ("B"). Lift force is equal to $K\sqrt{B}$ for zero lateral displacement, where K is magnetic stiffness. A flux sensing coil is preferably added to each lift magnet, which coil measures total integrated flux. Current control is then replaced with flux control.

Figure 1:
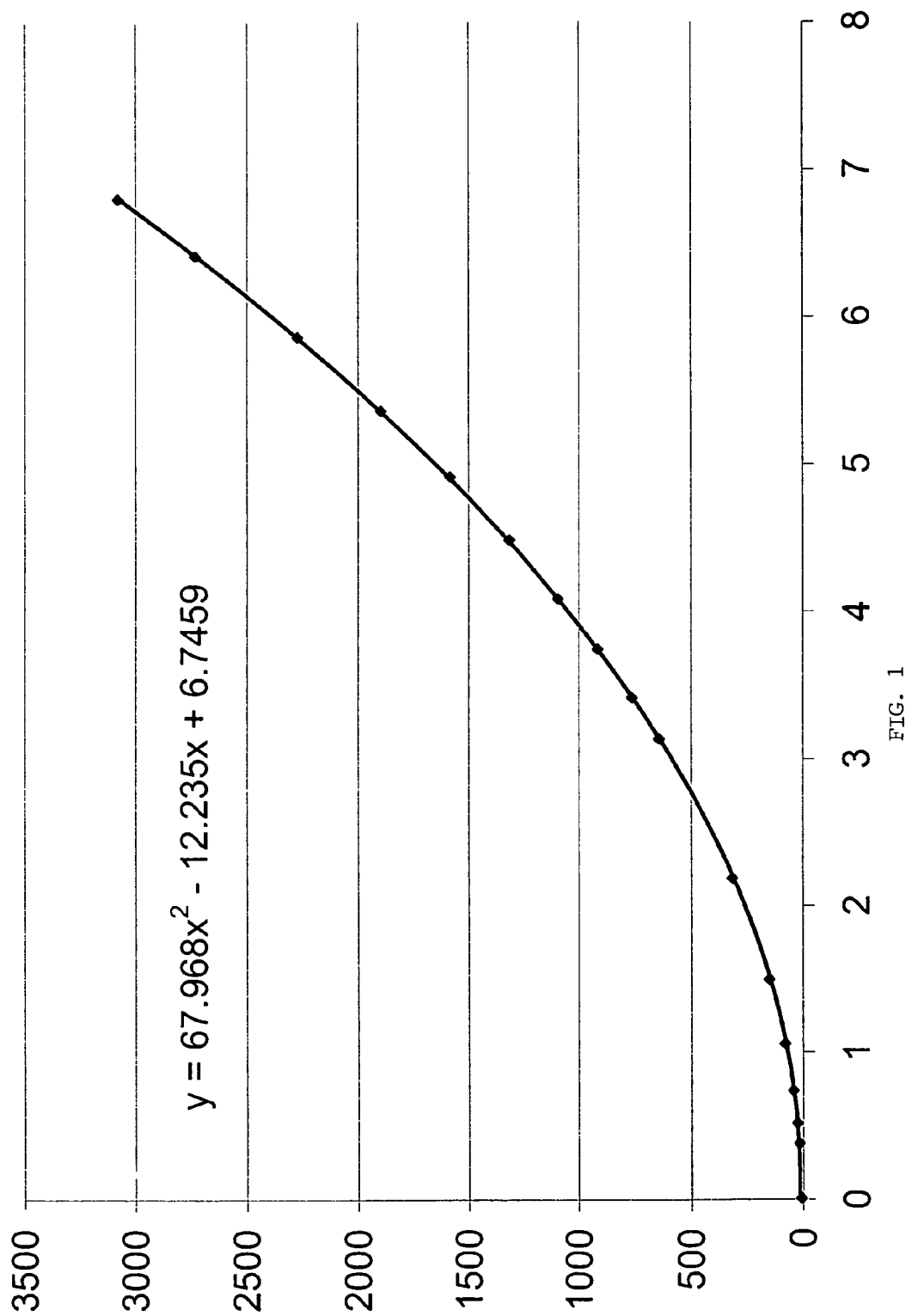
FIG. 1 is a graph of actual force and force predicted from flux density.
Figure 2:
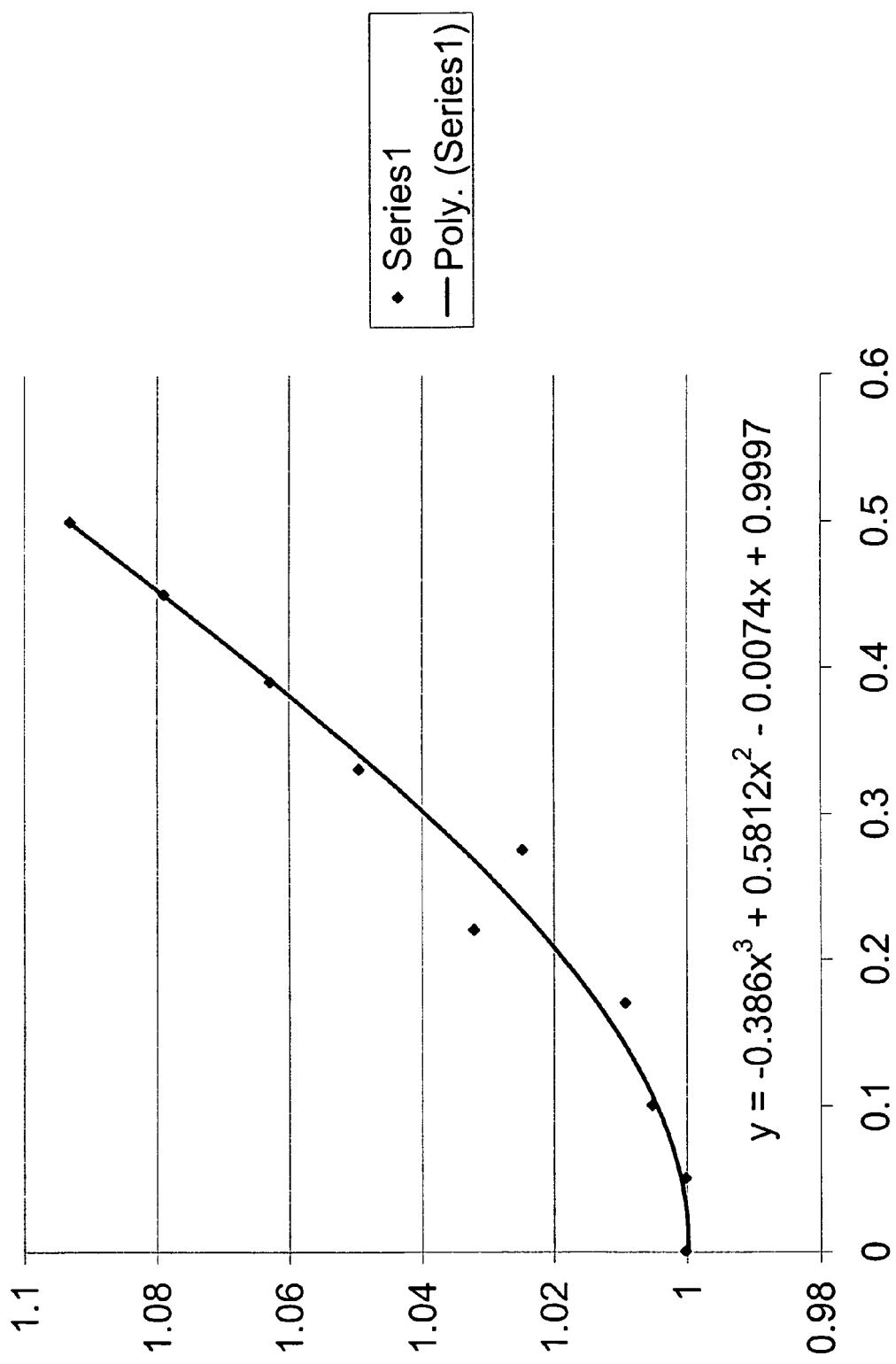
FIG. 2 is a graph of actual force and force predicted from lateral displacement.

Referring to FIGS. 1 and 2, flux density alone or in conjunction with lateral displacement (and/or gap) is a much better way to predict magnet force. The relationship to flux density is strong while the relationship to gap and lateral is weak. In FIG. 1 (force versus flux density), the curve is the prediction ($y=67.968x^2-12.235x+6.7459$) and the points are measured data. The peak error is less than 0.1%. In force vs. lateral displacement (FIG. 2), results are similar ($y=-0.386x^3+0.5812x^2-0.0074x+0.9997$). The peak error in this case is less than 1%. In prior force control methods, it is not unusual to see force errors as large as 40% due to gap measurement errors alone. As understood by one of ordinary skill in the art, the estimates provided by flux density can be combined with the estimates provided by lateral displacement to provide estimates with even less error than either along. The same is the case with the addition of predictions based on measured gap, which are known in the art, to the method.

As readily understood by one of ordinary skill in the art, the method of the invention can be implemented in a variety of electronic control systems, whether analog, digital via microprocessor, digital via microcode, digital via programmable logic controller, and the like.

Figure 3:
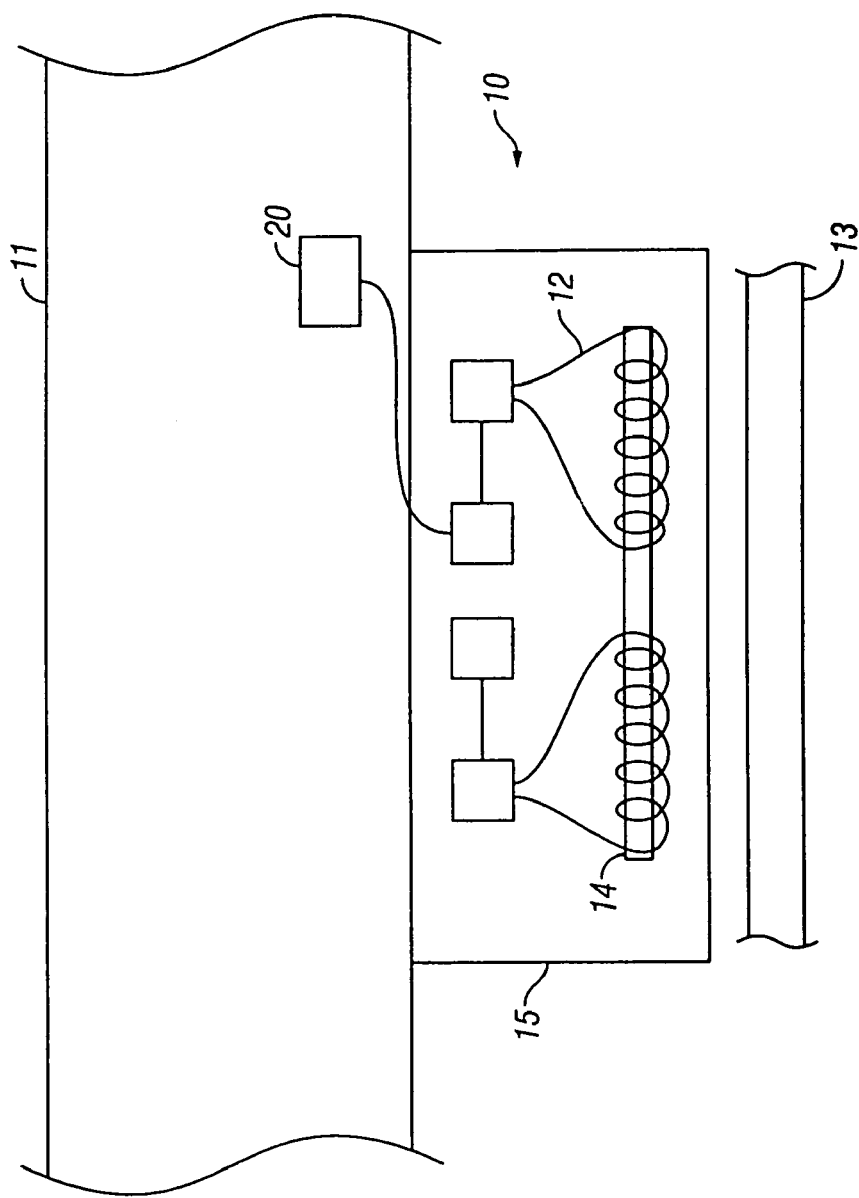
FIG. 3 is a schematic diagram of the apparatus of the invention.

One embodiment of an apparatus 10 according to the present invention is shown in FIG. 3. A rail 13 carries an attractive magnetic levitation device, particularly a carriage/train 11. A flux sensing coil 12 is added to the lift magnet (a coil is preferably added to all of the lift magnets, each requiring its own primary and secondary coil drivers and demodulation circuitry, not shown) 14 within bogie 15. (Note that the extent and location of the windings in FIG. 3 are not meant to be limiting.) The flux density reported by the coil is then employed by control means 20 according to the method of the invention.

Although the invention has been described in detail with particular reference to these preferred embodiments, other embodiments can achieve the same results. Variations and modifications of the present invention will be obvious to those skilled in the art and it is intended to cover all such modifications and equivalents.

What is claimed is:

1. A method for predicting attractive magnetic levitation force, the method comprising the steps of:
    measuring flux density for a component of an attractive magnetic levitation system; and
    computing a predicted attractive magnetic levitation force from the flux density; and
    wherein the method is performed for each of a plurality of bogies of the attractive magnetic levitation system.

2. The method of claim 1 wherein the computing step comprises calculating a polynomial equation.

3. The method of claim 1 wherein the computing step comprises calculating a second order polynomial equation.

4. The method of claim 1 additionally comprising computing a predicted attractive magnetic levitation force from measured lateral displacement.

5. The method of claim 4 wherein the step of computing a predicted attractive magnetic levitation force from measured lateral displacement comprises calculating a polynomial equation.

6. The method of claim 5 wherein the step of computing a predicted attractive magnetic levitation force from measured lateral displacement comprises calculating a third-order polynomial equation.

7. The method of claim 4 additionally comprising the step of combining the predictions made by the two computing steps.

8. The method of claim 4 additionally comprising the step of computing a predicted attractive magnetic levitation force from measured magnetic gap.

9. The method of claim 8 additionally comprising the step of combining the predictions made by the three computing steps.

10. The method of claim 1 wherein measuring flux density comprises employing a flux sensing coil.

11. The method of claim 1 wherein the predictions by the computing step have an error of less than or equal to approximately 1 percent.

12. The method of claim 11 wherein the predictions by the computing step have an error of less than or equal to approximately 0.1 percent.

13. An apparatus for predicting attractive magnetic levitation force, said apparatus comprising:
    means for measuring flux density of a component of an attractive magnetic levitation system; and
    means for computing a predicted attractive magnetic levitation force from the flux density; and
    wherein said means for measuring are provided to each of a plurality of bogies of the attractive magnetic levitation system.

14. The apparatus of claim 13 wherein said computing means calculates a polynomial equation.

15. The apparatus of claim 13 wherein said computing means calculates a second order polynomial equation.

16. The apparatus of claim 13 additionally comprising means for computing a predicted attractive magnetic levitation force from measured lateral displacement.

17. The apparatus of claim 16 wherein said means for computing a predicted attractive magnetic levitation force from measured lateral displacement calculates a polynomial equation.

18. The apparatus of claim 17 wherein said means for computing a predicted attractive magnetic levitation force from measured lateral displacement calculates a third-order polynomial equation.

19. The apparatus of claim 16 additionally comprising means for combining the predictions made by the two computing means.

20. The apparatus of claim 16 additionally comprising means for computing a predicted attractive magnetic levitation force from measured magnetic gap.

21. The apparatus of claim 13 additionally comprising means for combining the predictions made by the three computing means.

22. The apparatus of claim 13 wherein said means for measuring comprises a flux sensing coil.

23. The apparatus of claim 13 wherein the predictions by said computing means have an error of less than or equal to approximately 1 percent.

24. The apparatus of claim 23 wherein the predictions by said computing means have an error of less than or equal to approximately 0.1 percent.

25. A method for predicting attractive magnetic levitation force, the method comprising the steps of:
    measuring flux density for a component of an attractive magnetic levitation system; and
    computing a predicted attractive magnetic levitation force from the flux density, the computing step comprising calculating a polynomial equation.

26. The method of claim 25 wherein the computing step comprises calculating a second order polynomial equation.

27. A method for predicting attractive magnetic levitation force, the method comprising the steps of:
    measuring flux density for a component of an attractive magnetic levitation system;
    computing a predicted attractive magnetic levitation force from the flux density;
    computing a predicted attractive magnetic levitation force from measured lateral displacement; and
    combining the predictions made by the two computing steps.

28. The method of claim 27 wherein the step of computing a predicted attractive magnetic levitation force from measured lateral displacement comprises calculating a polynomial equation.

29. The method of claim 28 wherein the step of computing a predicted attractive magnetic levitation force from measured lateral displacement comprises calculating a third-order polynomial equation.

30. The method of claim 27 additionally comprising the steps of computing a predicted attractive magnetic levitation force from measured magnetic gap and combining the predictions made by the three computing steps.

31. A method for predicting attractive magnetic levitation force, the method comprising the steps of:
    measuring flux density for a component of an attractive magnetic levitation system; and
    computing a predicted attractive magnetic levitation force from the flux density; and
    wherein the predictions by the computing step have an error of less than or equal to approximately 1 percent.

32. The method of claim 31 wherein the predictions by the computing step have an error of less than or equal to approximately 0.1 percent.

33. An apparatus for predicting attractive magnetic levitation force, said apparatus comprising:
    means for measuring flux density of a component of an attractive magnetic levitation system; and
    means for computing a predicted attractive magnetic levitation force from the flux density, wherein said computing means calculates a polynomial equation.

34. The apparatus of claim 33 wherein said computing means calculates a second order polynomial equation.

35. An apparatus for predicting attractive magnetic levitation force, said apparatus comprising:
    means for measuring flux density of a component of an attractive magnetic levitation system;
    means for computing a predicted attractive magnetic levitation force from the flux density;
    means for computing a predicted attractive magnetic levitation force from measured lateral displacement; and
    means for combining the predictions made by the two computing means.

36. The apparatus of claim 35 wherein said means for computing a predicted attractive magnetic levitation force from measured lateral displacement calculates a polynomial equation.

37. The apparatus of claim 36 wherein said means for computing a predicted attractive magnetic levitation force from measured lateral displacement calculates a third-order polynomial equation.

38. The apparatus of claim 35 additionally comprising means for computing a predicted attractive magnetic levitation force from measured magnetic gap and means for combining the predictions made by the three computing means.

39. An apparatus for predicting attractive magnetic levitation force, said apparatus comprising:
    means for measuring flux density of a component of an attractive magnetic levitation system; and
    means for computing a predicted attractive magnetic levitation force from the flux density and
    wherein the predictions by said computing means have an error of less than or equal to approximately 1 percent.

40. The apparatus of claim 39 wherein the predictions by said computing means have an error of less than or equal to approximately 0.1 percent.

\* \* \* \* \*